3,544,432
ELECTROPLATING PLASTIC ARTICLES
Teiji Ishii and Koh Morita, Yokohama-shi, Kanagawa-ken, Japan, assignors to Chisso Corporation, Osaka-shi, Japan, a corporation of Japan
No Drawing. Filed Feb. 20, 1969, Ser. No. 801,191
Claims priority, application Japan, Mar. 19, 1968, 43/17,880
Int. Cl. C23b 5/12, 17/00; B44d 1/092
U.S. Cl. 204—20
10 Claims

ABSTRACT OF THE DISCLOSURE

In the electroplating of plastic articles, adhesion of the plated metal to the plastic substrate is improved by coating the surface of the plastic article with an adhesive layer of a carboxyl-modified, amorphous propylene polymer prior to the electroplating process steps such as sensitizing, activating, chemical plating and electroplating.

BACKGROUND OF THE INVENTION

The present invention relates to a method for electroplating plastic articles wherein the surface of the plastic article is coated with an adhesive layer of a carboxyl-modified, amorphous propylene polymer.

The electroplating of plastic articles generally comprises a series of steps which includes conditioning or chemical etching, sensitizing, activating, chemical plating and electroplating. It is well known that metal coatings deposited by conventional electroplating techniques fail to firmly adhere to the surfaces of unmodified plastic articles. Many processes have been described in the literature that deal with the problem of adherability of metallic coatings to nonconductive surfaces of plastic articles. One approach to solving this problem has been to condition the substrate by mechanical surface roughening which may be carried out by liquid honing or barrel tumbling with pumice stones. Chemical etching is performed using various substances depending upon the type of resin used to prepare the plastic articles. Acrylonitrile-butadiene-styrene resins may be chemically etched with an aqueous mixture of sulfuric acid and chromic acid. Polyolefins such as substantially crystalline polypropylene may be conditioned by acidic baths such as those described in U.S. patent application Ser. No. 635,683, filed May 3, 1967. Alkali solutions may be used to condition acrylic, cellulose acetate and various phenolic resins. The surface roughening treatments, when used to prepare the plastic surface to obtain adhesion of the metal to the plastic substrate, undesirably affect the plated surfaces of the molded plastic article. The surface roughening treatment may also tend to degrade the physical properties of the molded product and also increase the production cost due to expenses for labor and chemicals.

Other processes that aid in improving the bond strength between the metal coating and the polymer substrate involve the application of various adhesive layers to the surface of the plastic article. However, many of these adhesive layers have not proved to be entirely satisfactory in the plating industry.

The successful deposition of metals on plastic surfaces to accomplish a firm adhesive bond to the plastic substrate constitutes a highly desirable goal in view of the many recently developed engineering plastics which can be used as substitutes for zinc or other metals. A metallized plastic having good adhesion between the metal and the plastic substrate further improves the structural properties of the plastic and thereby enhances the use of plastics as substitutes for metals. Metallized plastics having satisfactory bond strength between the metal and the plastic substrate improve such physical properties as flexural modulus, impact strength and temperature deflection. The advantage of using metallized plastics includes lower cost of materials, less expensive tooling and tool maintenance, reduced finishing costs in buffing and polishing and lower shipping costs. Furthermore, plastics permit greater versatility of product design and result in a more corrosion-resistant end product.

SUMMARY OF THE INVENTION

It is an object of this invention to provide molded plastic articles having an adhesive layer that may be electroplated by conventional processes to obtain an adherent bond between the metal and the plastic article substrate. It is a further object of this invevntion to provide an adhesive layer on the surface of the plastic article that will enable an electroplated metal to adhere firmly to the surface of the molded plastic article. These and other objects of the invention are accomplished by applying an adhesive layer of a carboxyl-modified, substantially amorphous propylene polymer on the surface of the molded plastic article prior to subjecting the article to the electroplating process steps such as sensitizing, activating, chemical plating and final electroplating. The preferred adhesive layer is provided by a maleic anhydride-modified, substantially amorphous propylene polymer.

DESCRIPTION OF THE INVENTION

The molded plastic articles that are treated according to this invention are obtained from thermoplastic and thermosetting resins and include a wide variety of synthetic, modified synthetic and natural resins such as vinyl aromatic polymers such as polystyrene, acrylonitrile-butadiene-styrene (ABS) copolymers, styrene-acrylonitrile polymers, and elastomer-containing polystyrene; acrylic polymers such as poly(methyl methacrylate); cellulosic plastics such as cellulose butyrate, cellulose ABS or AB resin; epoxy resins such as reaction products of bisphenol-A with epichlorohydrin; phenolic resins such as resins of phenol and formaldehyde; resins obtained from melamine and/or urea; polyester resins such as alkyd resins or unsaturated polyester resins, as well as cross-linked polyester resins; polyurethanes; polyacetals; polyimides; polyamides such as nylon; polycarbonates; polyolefins such as polypropylene and particularly solid, substantially crystalline polypropylene, poly(4-methylpentene-1), poly(3-methylbutene-1), ethylene-propylene copolymers (including random amorphous ethylene-propylene copolymers as well as solid, substantially crystalline block copolymers of propylene and ethylene), ethylene acrylic copolymers, and ionomers; polyphenylene oxides; polysulfones; and vinyl resins such as polyvinyl chloride; polyvinylidene chloride, and polyvinyl fluoride. The plastic can, furthermore, contain inert organic fillers such as glass fibers, asbestos, talc, carbon, silica, and heavy metal salts. Particularly preferred for purposes of metallizing are vinyl aromatic resins, polyacetal resins, polyamide resins, polycarbonate resins, and polyolefin resins.

The carboxyl-modified, amorphous propylene polymer may be obtained by reacting an amorphous propylene polymer by heating with an unsaturated carboxyl-containing compound such as the unsaturated monocarboxylic acids and unsaturated dicarboxylic acids or anhydride in the presence of a free radical generating catalyst and in the presence or absence of an organic solvent. Generally the amount of unsaturated carboxyl-containing compound that is incorporated into the amorphous propylene polymer varies over a wide range but generally is about 20% by weight or less of the amorphous propylene polymer and preferably from about 0.5% to about 10% by weight. Representative unsaturated dicarboxylic compounds that may be used include maleic anhydride and itaconic acid. Preferred unsaturated monocarboxylic acids are acrylic acid and methacrylic acid.

The amorphous propylene polymer may be a polypropylene homopolymer that is obtained as a solvent-soluble by-product during the production of crystalline polypropylene by polymerizing propylene in the presence of a stereo-specific catalyst. In one known process, a slurry of the polymerization product in the liquid hydrocarbon reaction medium is contacted with a mixture of methanol and water to deactivate the catalyst. The bulk of the catalyst residue is dissolved in the aqueous methanol removed leaving a hydrocarbon slurry of crystalline polypropylene and hydrocarbon solution of amorphous polypropylene. This solution is removed from the crystalline polymer. The solution is distilled to recover the hydrocarbon solvent which is recycled. The solid material which remains is the amorphous polypropylene that may be employed in preparing the modified polymers of this invention. Suitable amorphous polypropylene is available commercially, such as "Oletac 100" produced by Avisun Corporation.

Amorphous polypropylene, soluble in boiling pentane, hexane, heptane and other hydrocarbons, may be obtained during the stereo-specific polymerization of propylene in the presence of such catalysts as a coordination complex of a transition metal halide with an organometallic compound and generally has a molecular weight of from about 15,000 to about 60,000, as determined from intrinsic viscosity measurements in tetrahydronaphthalene at 135° C. using correlations found in J. Phys. Chem., vol. 69, 2002 (1959).

Amorphous polypropylene obtained as a by-product of the stereo-specific polymerization of propylene may contain minor amounts of crystalline polypropylene and amounts of crystalline polypropylene up to about 15% will not adversely affect the adhesive properties of the carboxyl-modified, amorphous propylene polymer used in this invention.

The amorphous polypropylene may be modified with one or more other alpha-olefins such as those that are derived from ethylene and other olefins having 4 to 8 carbon atoms such as butene-1, pentene-1, etc. Amorphous ethylene-propylene polymers may have molecular weights as high as 200,000. Other optional modifiers include elastomeric materials, ethylenic copolymers and petroleum resins which may be added to improve the workability of the adhesive. The amorphous propylene copolymers are well known and may be prepared by conventional methods.

The carboxyl-modified amorphous propylene polymeric adhesives of this invention may be applied to substrates of molded plastic articles by any conventional coating technique desired by the practitioner. Thus, the adhesives may be applied by using a solution of a carboxyl-modified, amorphous propylene polymer in a suitable organic solvent. The total solids content of the adhesive composition may vary from about 5% to about 50% by weight. Suitable organic solvents include such aromatic hydrocarbons as toluene, benzene and xylene, such aliphatic hydrocarbons as hexane, heptane, octane and decane and chlorinated hydrocarbons such as trichloroethylene, perchloroethylene, dichloroethane and chlorobenzene. The adhesive may be sprayed onto the substrate or applied by brushing or dipping. Other mechanical coating process such as the trailing blade, reverse roll or roller coating techniques may also be employed. After the adhesive is applied to the molded plastic article, drying is accomplished at an elevated temperature to volatilize the solvent. Alternatively, the carboxyl-modified amorphous propylene polymeric adhesive may be coated in a molten state directly on the surface of a thermosetting resin or a thermoplastic resin having a melting point sufficiently high to avoid deformation of the molded article.

After the article has been coated, electroplating may be performed using conventional processes such as subjecting the article to sensitizing, activating, chemical plating (electroless plating) and electroplating. For example, an aqueous hydrochloric acid solution of stannous chloride may be used for sensitizing and a hydrochloric acid solution of palladium chloride, gold chloride or silver nitrate for the activating. The molded article is dipped in these solutions at room temperature to about 60° C.

Chemical plating (electroless plating) is carried out by immersing the molded article in an aqueous solution consisting of a copper, a nickel or a silver salt and a reducing agent, such as formalin or sodium hypophosphite, and as a result the corresponding chemical copper, nickel or silver plating can be achieved. The thickness of the plating film may be in the range of 0.2 to 0.5 micron. Thereafter, the article may be electroplated in a manner similar to ordinary metal articles. Generally the thickness of the electroplated coating varies between 0.1 and 1.5 mil.

The thickness of the electroplated film varies with applications but a better surface luster can be achieved with a thinner film by the present and improved method compared to a conventional method which uses the surface roughening treatment. Improved adhesion of the plated metal to the substrate of the molded plastic article is obtained by using the adhesive layer of this invention; however, the reasons for the improved adhesion are not specifically understood but probably are attributable to the ability of the carboxyl-modified, amorphous propylene polymer to penetrate the surface film of the molded plastic article and to diffuse thereinto.

EXAMPE 1

100 parts of amorphous polypropylene having an intrinsic viscosity of 0.34 (measured in tetrahydronaphthalene at 135° C.), 50 parts of maleic anhydride and 10 parts of benzoyl peroxide were dissolved in 500 parts of toluene and then stirred at 100° C. for 5 hours. Thereafter, the solution was poured into a large amount of acetone. The precipitated maleic anhydride-amorphous polypropylene product was recovered and upon analysis it was found to contain 5.5% of maleic anhydride.

Ten injection molded articles of each acrylontrile-butadiene-styrene resin, high density polyethylene, crystalline polppropylene and melamine-urea resin were dipped for several seconds into a 10% toluene solution of the maleic anhydride-amorphous polypropylene product and then the articles were dried with forced air at 80° C. for 30 minutes.

After drying, each molded article was immersed in a sensitizing bath containing 10 g. of stannous chloride, 40 cc. of concentrated hydrochloric acid and 960 cc. of water at room temperature for 3 minutes, water washed, immersed in an activating bath containing 0.3 g. of palladium chloride, 2.5 cc. of concentrated hydrochloric acid and 1000 cc. of water at room temperature for 2 minutes, water washed and then dipped into an electroless copper plating solution containing per liter of solution 29 g. of copper sulfate, 140 g. of Rochelle salts, 40 g. of sodium hydroxide and 166 g. of formaldehyde (37% solution) at 20° C. for 15 minutes; as a result, mirror-luster copper was educed over the entire surface.

Then the activated articles were placed in a bright acid copper-plating solution containing 200 g./l. of copper sulfate and 50 g./l. of sulfuric acid. Electroplating was conducted at an anode current density of 0.5 A./dm.$^2$ for 10 minutes and then subjected to copper plating for 15 minutes at an elevated current density of 5 A./dm.$^2$. The articles were nickel-plated in a bright nickel plating solution, containing 300 g./l. of nickel sulfate, 60 g./l. of nickel chloride and 40 g./l. of boric acid, at 50° C. at a current density of 5 A./dm.$^2$ for 10 minutes, and then chrome-plated immediately in an agitated bath containing 250 g./l. of chromic anhydride and 2.5 g./l. of sulfuric acid at 30° C. at a current density of 20 A./dm.$^2$ for 2 minutes. Each chrome plated molded plastic article had good surface luster.

Each electroplated plastic article was subjected to a thermal cycle test which is used to evaluate physical durability of metal plated plastics and the adhesion of plated metal layers to substrates of plastic articles. The articles were subjected to five cycles wherein each cycle comprised 60 minutes at room temperature followed by 60 minutes at —20° C. and then 60 minutes at room temperature. All of the plated plastic articles passed the test.

EXAMPLE 2

100 parts of an amorphous polypropylene having a molecular weight of about 16,000 to 20,000 and a viscosity at 300° F. of 4200 to 5800 cps., 40 parts of maleic anhydride and 10 parts of benzoyl peroxide were dissolved in 500 parts of toluene and stirred at 100° C. for five hours. The resulting solution was placed in acetone and the precipitated maleic anhydride-modified, amorphous polypropylene was recovered. A 10% toluene solution thereof was prepared.

Several molded plaques were prepared from a crystalline polypropylene homopolymer having a flow rate of 3.4 (ASTM D–1238–62T) and containing 0.5% of dilaurylthiodipropionate, 0.2% of 2,6-ditertiarybutyl 4-methyl phenol, 0.15% of calcium stearate and 5% of TiO$_2$. The molded plaques were degreased and then dried to obtain a clean surface which was dipped into the maleic anyhydride-modified, amorphous polypropylene adhesive solution. The coated article was then dried in an oven for about 40 minutes to vaporize the solvent.

The plaques were immersed consecutively in a stannous chloride sensitizer solution containing per liter of solution 10 g. of SnCl$_2$ and 40 ml. of HCl at ambient temperatures for 1 to 3 minutes; in an activator solution containing per gallon of solution 1 g. of palladium chloride and 10 ml. of HCl for a period of 1 to 2 minutes at ambient temperatures; and in an electroless copper plating solution containing per liter of solution 29 g. of copper sulfate, 140 g. of Rochelle salt, 40 g. of sodium hydroxide and 166 g. of formaldehyde (37% solution) at a temperature of 70° C. for a period sufficient to obtain a continuous coating capable of conducting electricity. Between each of the immersions described, the plaques were thoroughly rinsed with distilled water. The resulting plaques on washing with water were then electroplated with copper for about 20 minutes, at a current density of approximately 30 amps/sq. ft., resulting in about a 1 mil coating of copper on the plaques.

The electroplated plaques were evaluated in the previously-described thermal cycle test and all plaques successfully passed the test.

EXAMPLE 3

A solution having a 12% solids content was prepared from a maleic anhydride-modified ethylene-amorphous propylene copolymer having a propylene content of about 75 mol percent and a maleic anhydride content of about 6%. The adhesive solution was applied to a clean degreased polypropylene plaque and thereafter electroplating was conducted according to the process described in Example 2. Good bond strength between the deposited metal and the plastic substrate was obtained.

EXAMPLE 4

An acrylic acid-modified, amorphous polypropylene polymer containing about 5% acrylic acid was solubilized in toluene to prepare an adhesive solution having a 10% solids content. The adhesive was applied to a clean, degreased surface of a polypropylene plaque and after baking to remove solvent electroplating was conducted according to the procedure of Example 2. Satisfactory adhesive strength was obtained.

We claim:
1. In a method for electroplating plastic articles wherein said articles are made electrically conductive and thereafter electroplated, the improvement of applying to the surface of the plastic article an adhesive coating comprising a carboxyl-modified, amorphous propylene polymer prior to subjecting said article to an electroplating process.

2. A process according to claim 1 wherein said carboxyl-modified, amorphous propylene polymer has a carboxyl content of about 20% by weight or less, and said polymer is obtained by reacting an amorphous propylene polymer with an unsaturated carboxyl-containing compound selected from the group consisting of maleic anhydride, itaconic acid, acrylic acid and methacrylic acid.

3. A process according to claim 1 wherein said electroplating process comprises the steps of sensitizing, activating, chemical plating and electroplating.

4. A process according to claim 1 wherein said carboxyl-modified, amorphous propylene polymer is a maleic anhydride-modified, amorphous propylene polymer and said polymer has a carboxyl content from about 0.5% to about 10% by weight based on the weight of the modified polymer.

5. A process according to claim 3 wherein said carboxyl-modified, amorphous polypropylene is a maleic anhydride-modified, amorphous polypropylene.

6. A process according to claim 1 wherein said plastic article is molded from a polyolefin.

7. A process according to claim 6 wherein said polyolefin is a solid, substantially crystalline propylene polymer.

8. In a process for electroplating molded plastic articles which comprises (a) applying to the surface of the molded plastic article a thin adhesive coating, (b) drying said coating at an elevated temperature, (c) sensitizing, (d) activating, (e) chemical plating and (f) electroplating said plastic article, the improvement wherein said adhesive coating is a carboxyl-modified polymer defined by claim 1.

9. A process according to claim 8 wherein said carboxyl-modified polymer is a maleic anhydride-modified, amorphous propylene polymer.

10. A process according to claim 8 wherein said plastic article is a solid, substantially crystalline propylene polymer.

References Cited

UNITED STATES PATENTS

| | | | |
|---|---|---|---|
| 3,305,460 | 2/1967 | Lacy | 204—20 |
| 3,259,559 | 7/1966 | Schneble et al. | 204—38 |
| 2,917,439 | 12/1959 | Liu | 204—22 |

JOHN H. MACK, Primary Examiner

R. L. ANDREWS, Assistant Examiner

U.S. Cl. X.R.
117—47; 204—30